United States Patent
Clausen et al.

(10) Patent No.: US 10,891,688 B1
(45) Date of Patent: Jan. 12, 2021

(54) SYSTEMS AND METHODS FOR DYNAMIC INTERFACE CHANGES

(71) Applicant: Wells Fargo Bank, N.A., San Francisco, CA (US)

(72) Inventors: Christopher P. Clausen, Novato, CA (US); Andrew J. Garner, IV, State Road, NC (US); Benjamin Geertz, Milwaukie, OR (US); Bryan Kroll, San Mateo, CA (US); Muhammad Farukh Munir, Pittsburg, CA (US); Daniel Oshima, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 441 days.

(21) Appl. No.: 15/621,293

(22) Filed: Jun. 13, 2017

Related U.S. Application Data (60) Provisional application No. 62/492,071, filed on Apr. 28, 2017.

(51) Int. Cl.
  *G06Q 40/02* (2012.01)
  *G06F 3/0481* (2013.01)
  *G06F 40/109* (2020.01)

(52) U.S. Cl.
  CPC ........... *G06Q 40/02* (2013.01); *G06F 3/0481* (2013.01); *G06F 40/109* (2020.01); *G06F 2203/04805* (2013.01); *G06F 2203/04806* (2013.01)

(58) Field of Classification Search
  CPC .................................................... G06Q 40/02
  USPC ........................................................... 705/35
  See application file for complete search history.

(56) References Cited

U.S. PATENT DOCUMENTS

| | | | |
|---|---|---|---|
| 7,580,891 B2 | 8/2009 | Klebanoff | |
| 7,945,515 B2 | 5/2011 | Zoldi et al. | |
| 8,635,117 B1 | 1/2014 | Acuna-Rohter | |
| 8,862,526 B2 | 10/2014 | Miltonberger | |
| 8,918,904 B2 | 12/2014 | Sanin et al. | |
| 9,418,365 B2 | 8/2016 | Groarke et al. | |
| 9,483,606 B1 | 11/2016 | Dean et al. | |
| 2003/0071859 A1* | 4/2003 | Takami | G06F 3/016 715/865 |
| 2010/0169192 A1* | 7/2010 | Zoldi | G06Q 40/00 705/30 |
| 2010/0325035 A1 | 12/2010 | Hilgers et al. | |
| 2012/0011041 A1 | 1/2012 | Beydler et al. | |
| 2012/0191596 A1 | 7/2012 | Kremen et al. | |
| 2012/0226579 A1 | 9/2012 | Ha et al. | |
| 2013/0054447 A1 | 2/2013 | Ross et al. | |
| 2013/0054480 A1 | 2/2013 | Ross et al. | |
| 2014/0067656 A1 | 3/2014 | Cohen Ganor et al. | |
| 2015/0052061 A1 | 2/2015 | Anderson et al. | |

(Continued)

*Primary Examiner* — Lindsay M Maguire
(74) *Attorney, Agent, or Firm* — Foley & Lardner LLP (57) ABSTRACT

A system for causing a dynamic interface adjustment includes a user device. The user device includes an active financial interface associated with a financial institution. The system further includes a computer system communicatively coupled to the user device. The computer system is configured to receive, via the user device, a sensory input associated with a customer of the financial institution, determine a sensory impairment associated with the customer based on the sensory input, and cause a dynamic interface adjustment of the active financial interface in response to the determination of the sensory impairment.

24 Claims, 3 Drawing Sheets

(56) References Cited

U.S. PATENT DOCUMENTS

| | | |
|---|---|---|
| 2016/0034898 A1 | 2/2016 | Ghosh |
| 2016/0134720 A1 | 5/2016 | Pochic et al. |
| 2016/0140561 A1 | 5/2016 | Cowan |
| 2016/0314471 A1 | 10/2016 | Gerber et al. |
| 2016/0335614 A1 | 11/2016 | Norota |
| 2016/0335641 A1 | 11/2016 | White et al. |

* cited by examiner

SYSTEMS AND METHODS FOR DYNAMIC INTERFACE CHANGES

CROSS-REFERENCE TO RELATED APPLICATIONS

This application claims priority to U.S. Provisional Patent Application No. 62/492,071, filed Apr. 28, 2017, entitled "SYSTEMS AND METHODS FOR DYNAMIC INTERFACE CHANGES", the entire contents of which are hereby incorporated by reference in its entirety.

BACKGROUND

Generally, an impairment of the senses can cause people difficulties with activities such as accessing financial services or interacting with an automated voice system. For example, a customer may have a visual impairment that makes it difficult for the customer to utilize a financial services website or application. The customer may be unable to see text due to the font size. Some customers may have hearing impairments such that the customer cannot hear the voice of a virtual representative of an automated voice system. In some instances, the customer may be forced to rely on the assistance of others such as a caregiver, family member, or guardian to engage in financial services or to use such websites and applications. In such examples, the customer depends on others to explain or perform certain transactions which can provide opportunities for fraud and/or abuse.

SUMMARY

One embodiment relates to a method of causing a dynamic interface adjustment. The method comprises receiving, via an active financial interface communicatively coupled to a financial institution, a sensory input associated with a customer of the financial institution, determining a sensory impairment associated with the customer based on the sensory input, and causing a dynamic interface adjustment of the active financial interface in response to the determination of the sensory impairment.

One embodiment relates to a system for causing a dynamic interface adjustment of a customer device. The system includes a user device and a computer system communicatively coupled to the user device. The user devices includes an active financial interface associated with a financial institution. The computer system is configured to receive, via the user device, a sensory input associated with a customer of the financial institution; determine a sensory impairment of the customer based on the sensory input; and cause a dynamic interface adjustment of the active financial interface in response to the determination of the sensory impairment.

One embodiment relates to a computer implemented method of causing a dynamic interface adjustment of a customer device. The method includes receiving, via an active financial interface communicatively coupled to a financial institution, a sensory input associated with a customer of the financial institution; determining a sensory impairment of the customer based on the sensory input; and causing a dynamic interface adjustment of the active financial interface in response to the determination of the sensory impairment.

These and other features, together with the organization and manner of operation thereof, will become apparent from the following detailed description when taken in conjunction with the accompanying drawings.

DETAILED DESCRIPTION

Referring to the figures generally, systems and methods of causing a dynamic interface adjustment are described. The system includes a user device. The user device includes an active financial interface associated with a financial institution. The system further includes a computer system communicatively coupled to the user device. The computer system is configured to receive, via the user device, a sensory input associated with a customer of the financial institution, determine a sensory impairment associated with the customer based on the sensory input, and cause a dynamic interface adjustment of the active financial interface in response to the determination of the sensory impairment. The dynamic interface adjustment of the active financial interface is caused in real-time or near real-time.

The embodiments and implementations of the systems and methods disclosed herein improve current computing systems for providing financial services to individuals who are unable to utilize such systems due to an impaired sense. These systems, methods, and computer implementations improve such computing systems by dynamically adjusting an interface to improve the fields of impaired sense computing systems, impaired sense communication systems, security systems, and information management. As such, the systems, methods, and computer implementations disclosed herein improve the functioning of such systems and information management by providing functionalities that are novel and non-obvious improvements over current systems.

Figure 1:
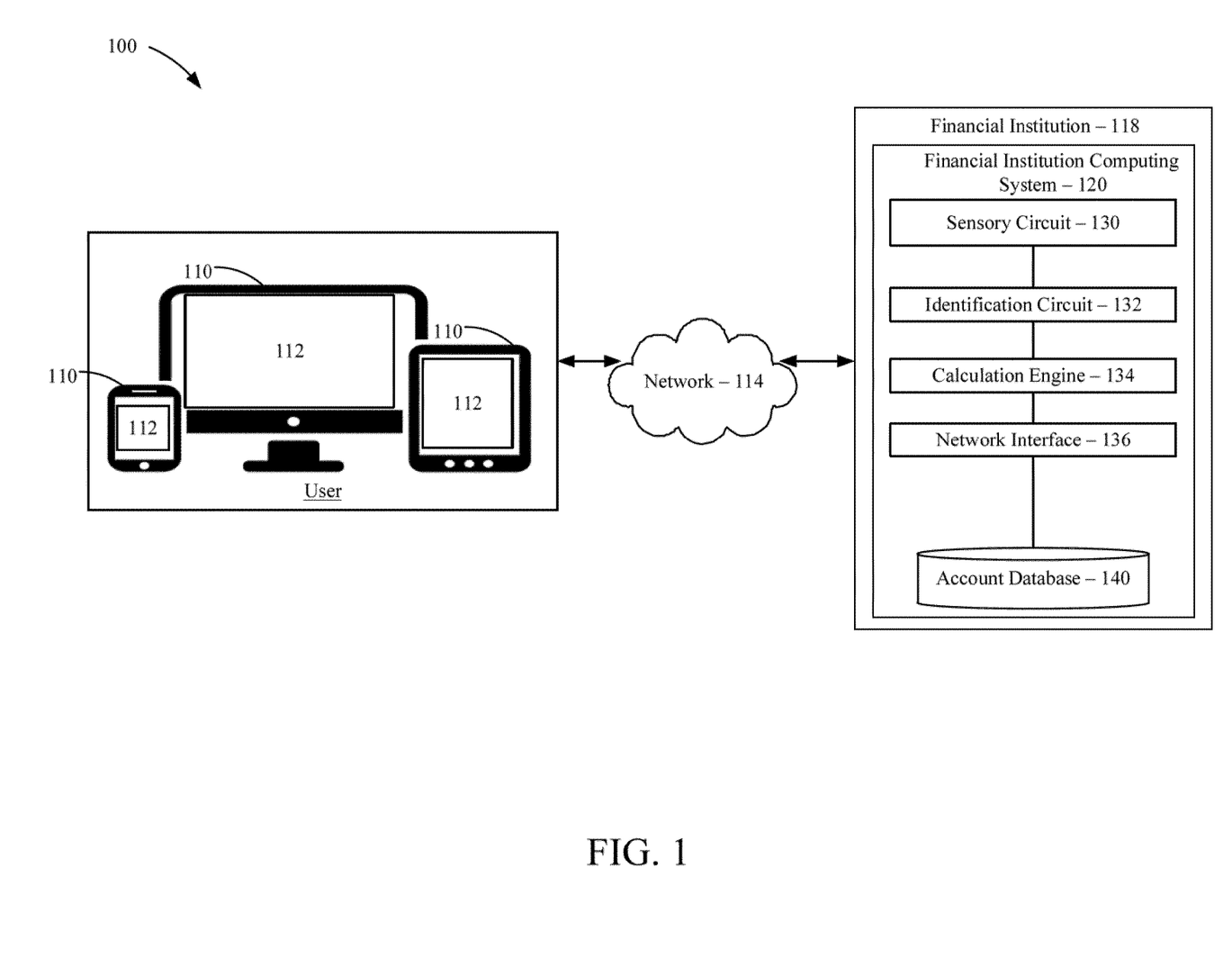
FIG. 1 is a block diagram of a dynamic interface system according to an example embodiment.

Referring to FIG. 1, a block diagram of a dynamic interface system 100 for a financial institution is shown according to an example embodiment. Generally, the financial institution provides financial services (e.g., demand deposit accounts, credit accounts, etc.) to a plurality of customers. The financial institution provides banking services to the customers, for example, customers can deposit funds into accounts, withdraw funds from accounts, transfer funds between accounts, view account balances, and the like via a financial interface associated with the financial institution computing system. The dynamic interface system 100 includes the user device 110, network 114, and the financial institution computing system 120. In some embodiments, the dynamic interface system 100 may include a third party system. The user device 110 is structured to facilitate customer transactions via the financial institution computing system 120.

As described in further detail, the dynamic interface system 100 includes the user device 110. The user device 110 may include or otherwise may be communicatively coupled to an active financial interface 112 (e.g., a user interface, automated voice system, an automated menu system, automated dialing system, interactive voice response system, etc., configured to receive a sensory input) associated with the financial institution. As used herein, the term "sensory input" may refer to an input configured to supplement for an impairment of the senses such as an input associated with a screen change (e.g., adjusting the screen size or other components of the screen, changing the screen background, etc.), font change (e.g., increasing the font size, changing the font color, etc.), screen reader (activating a programmatic reader of the text on the screen), voice input, volume adjustment (e.g., increasing the volume), dexterity input (e.g., a typing input). Customers of the financial institution can access the various services provided by the financial institution through the active financial interface 112. In some embodiments, the dynamic interface system 100 is configured to sense and determined that a customer has a sensory impairment (e.g., reduced hearing and/or sight). For example, the customer may be an individual age 70 who has experienced a hearing impairment and/or a visual impairment due to age. In some examples, the customer may be an individual who has experienced a temporal or permanent impairment in hearing and/or sight due to a recent sporting incident, accident, medical condition, or other sensory altering event. For example, the dynamic interface system 100 may determine that an impairment is temporal by determining that the individual's sensory feedback is first in a normal range, that it then degrades over time or during an interaction with the dynamic interface system 100, and finally their sensory feedback returns to normal levels either during the interaction, during a future interaction, or over time across multiple future interactions. In some examples, the dynamic interface system 100 is configured to determine that the customer has experienced a progressive impairment in hearing and/or sight such as conductive hearing loss, sensorineural hearing loss, progressive retinal atrophy, age-related macular degeneration, chronic open-angle glaucoma, diabetic retinopathy, etc. The dynamic interface system 100 is configured to determine if the impairment is bilateral and affects both ears and/or eyes or unilateral and affects a single ear or eye. Accordingly, the active financial interface 112 may facilitate the determination of a sensory impairment (e.g., a visual impairment, hearing impairment, or a combination thereof) associated with a customer of the financial institution. For example, the active financial interface 112 associated with the user device 110 may receive a sensory input such that a sensory impairment associated with a customer may be determined. In turn, a dynamic interface adjustment (e.g., an audible adjustment, visual adjustment, input response adjustment, communication mode adjustment, or a combination thereof) may be caused in response to the determination of the sensory impairment in real-time or near real-time.

The financial institution computing system 120 is a back-end computer system that supports the user device 110 and other financial services offered by the financial institution. Accordingly, the financial institution computing system 120 includes a network interface 136, a sensory circuit 130, an identification circuit 132, a calculation engine 134, and an account database 140. The financial institution computing system 120 is structured to monitor the sensory state of the customer directly or via a network (e.g., the network 114.). The network interface 136 may communicate over any of a variety of network protocols, including Ethernet, Bluetooth, WiFi, and the like. The account database 140 is structured to maintain accounts associated with customers of the financial institution and to facilitate transactions associated with the accounts. The account database 140 may store sensory data and customer account information, including account numbers, account balances, customer contact information, customer preferences, and other account information. As used herein, the term "sensory data" may be used to refer to data associated with the physical senses such as, but not limited to, sight, touch, hearing, etc. which may be perceived or transmitted.

Still referring to FIG. 1, the user device 110 may include smartphones, tablet computing devices, mobile devices, wearable computing devices (e.g., a smartwatch, smart optical wear, etc.), personal computing devices such as laptops, digital assistance devices (e.g., a voice activated device configured to assist a user), PDAs, portable media devices, vehicle infotainment systems, etc. that may access one or more programs, servers, networks, central computers, etc. The user device 110 may communicate with the financial institution computing system 120 of the financial institution through the network 114. In some arrangements, the network 114 includes the internet, cellular networks, personal area networks, WiFi networks, etc. The user device 110 may execute a financial institution application associated with the financial institution. The financial institution application may include the active financial interface 112. In some arrangements, the application is executed locally on the user device 110 (e.g., a smartphone, tablet computing device, etc.). In other arrangements, the user device 110 may be communicatively coupled to the financial institution computing system 120 via an active financial interface 112, such as an automated voice system. For example, customers may use, via the user device 110, the automated voice system to access various services provided by the financial institution. Via the active financial interface 112, the sensory state of the customer may be monitored and/or information about the customer, information about his or her accounts with the financial institution (e.g., balances, interest rates, etc.), bill payment, automated teller machine (ATM) and branch location information, and additional services offered by the financial institution may be accessed. For example, the financial institution computing system 120 may be able to determine a sensory impairment of a customer of the financial institution as described in further detail herein.

Figure 2:
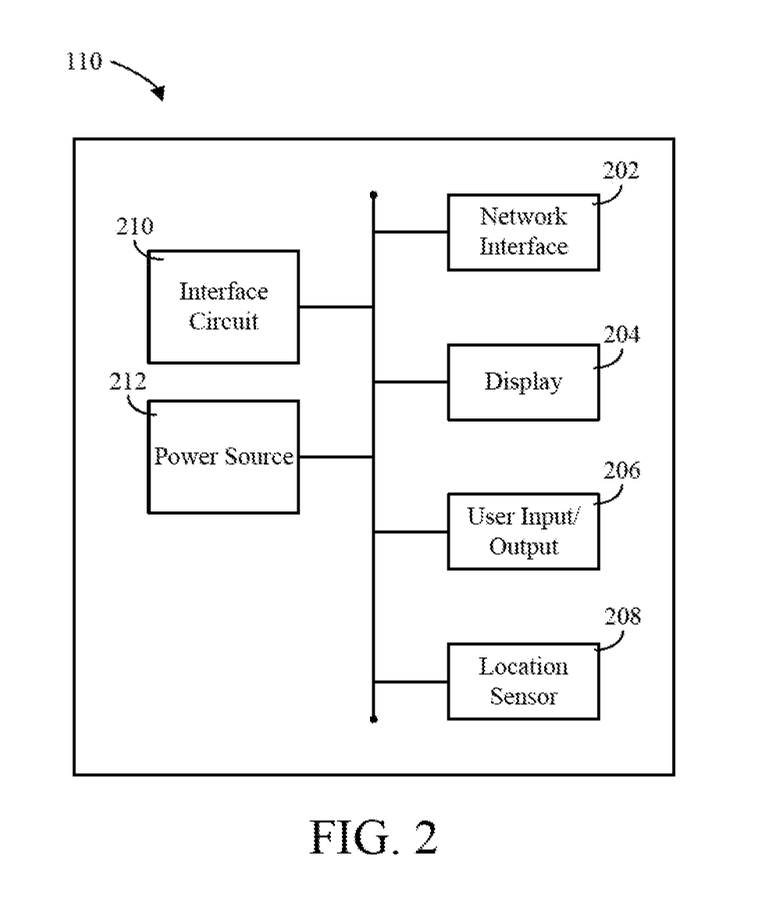
FIG. 2 is a block diagram of a user device according to an example embodiment.

Referring to FIG. 2, a block diagram of the user device 110 is shown according to an example embodiment. As discussed above, the user device 110 may be a smartphone, tablet computing device, wearable computing device, personal computing device, etc. The user device 110 includes a network interface 202. The network interface 202 is a wireless network interface. The wireless network interface 202 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Additionally, the network interface 202 is capable of communicating with the financial institution computing system 120 via the network 114 (e.g., via any combination of the Internet, cellular networks, personal area networks, WiFi networks, etc.).

The user device 110 may include a display 204 and a user input/output 206. In some arrangements, the display 204 and the user input/output 206 are combined (e.g., as a touchscreen display device). In other arrangements, the display 204 and the user input/output 206 are discrete devices. The user input/output 206 includes any of speakers, keyboards, notification LEDs, microphones, buttons, switches, cameras, or a combination thereof.

The user device 110 includes a power source 212. The power source 212 may include grid power, battery power (e.g., alkaline batteries, rechargeable batteries, etc.), and/or another energy source. In arrangements where the power source 212 is a rechargeable battery, the user device 110 also includes circuitry configured to recharge the battery.

The functionality of the user device 110 described herein is controlled at least in part by the interface circuit 210. In some configurations, the functionality of the user device 110 may be controlled by the interface circuit 210 and the transaction circuit 208. The interface circuit 210 is structured to cause a dynamic interface adjustment of the active financial interface in response to the determination of the sensory impairment. The transaction circuit 208 is structured to allow a customer of the financial institution to access financial services or otherwise engage in financial transactions with the financial institution via the active financial interface 112 of the user device 110 (e.g., access and/or update account information, deposit funds, transfer funds, withdraw funds, open accounts, close accounts etc.).

Figure 3:
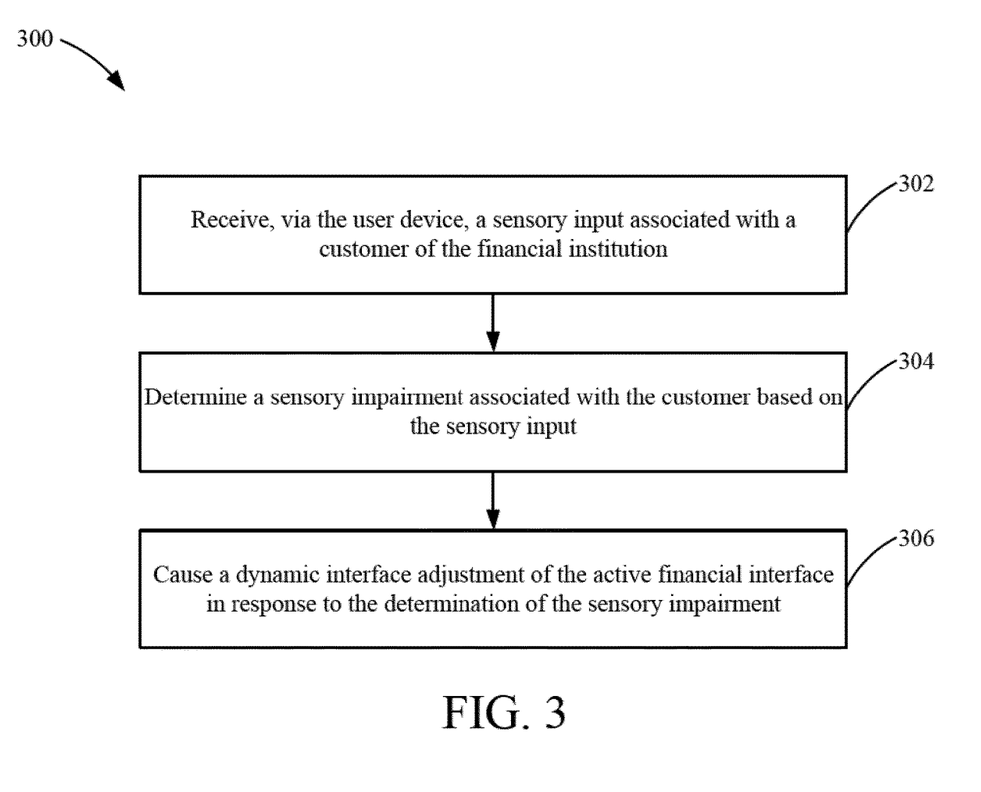
FIG. 3 is a flow diagram of a method of causing a dynamic interface adjustment.

Referring to FIG. 3, a flow diagram of a method 300 of causing a dynamic interface adjustment is described according to an example embodiment. Method 300 may be performed by the interface circuit 210 and/or the transaction circuit 208 of the user device 110 such that reference may be made to the respective circuits to help explain the features, processes, and aspects of method 300. In some configurations, the interface circuit 210 and/or the transaction circuit 208 of the user device 110 may be communicatively connected to the sensory circuit 130, the identification circuit 132, the calculation engine 134, and/or the account database 140 of the financial institution computing system 120. The flow diagram details the interaction between the active financial interface 112 of the user device 110, the financial institution computing system 120, and various systems and/or devices associated with the customer. The user device 110 may take the form of a smartphone, tablet, laptop, wearable, or a combination thereof.

The method 300 begins when the active financial interface 112 receives, via the interface circuit 210, a sensory input (e.g., an input configured to supplement for an impairment of the senses) associated with a customer of the financial institution at 302. The customer may be at a branch location, ATM, and/or third party location associated with the financial institution. In some examples, the customer may utilize a financial services website or application to connect to the active financial interface 112. The active financial interface 112 may be accessible, via the user device 110 (e.g., a smartphone, tablet, laptop), by a customer of the financial institution. While accessing the active financial interface 112, the customer may experience difficulty utilizing the active financial interface 112 such that the customer may provide a sensory input to the active financial interface 112. For example, the customer may be unable to see the font of the screen and/or hear an automated prompt or message. In turn, the interface circuit 210 may receive the sensory input via the active financial interface 112. In some arrangements, the interface circuit 210 may be structured to vary visual, auditory, sensory, and memory tests dynamically as the user is actively interacting with the active financial interface 112 or prior to initiating an adjustment of the active financial interface 112 to detect which interface option (e.g., which visual and/or auditory adjustment) provides the response structured to account for the impairment of the customer.

In some arrangements, the sensory input may take the form of a screen change. For example, the customer may experience difficulty viewing the active financial interface 112 such that the customer provides a sensory input such as an adjustment of the screen size, dimensions, or other components of the screen or window to the active financial interface 112. In examples wherein the customer needs an accommodation for various vision impairments associated with color, the customer may provide a sensory input such as an adjustment or otherwise change to the screen background color. In other examples, the customer may need an accommodation for various vision impairments associated with the text or font, the customer may provide a sensory input such as a change to the font (e.g. increase or decrease the font size, change the font color, etc.) to the active financial interface 112. In some examples, the customer may have a sensory impairment that requires the use of a screen reader. In such examples, the interface circuit 210 may receive a sensory input from the use of a programmatic reader of the screen text. The sensory circuit 130 may receive a sensory input such as a dexterity input (e.g. a typing input) in response to a customer of the financial institution interacting with (e.g., depressing, touching, etc.) the keyboard, keypad, or other character input system or user input/output 206 system or application of the user device 110.

Alternatively or additionally, the customer may need an accommodation for various hearing impairments. The dynamic interface system 100 can determine that a hearing impairment is attributed to a physical impairment. In some examples, the dynamic interface system 100 takes into account various factors such as, but not limited to, background noise, wind, rain, thunder, or other environmental factors that can contribute to the ability of the customer to hear properly or otherwise interact with the dynamic interface system 100. Accordingly, the customer may provide a sensory input such as a volume adjustment (e.g., increasing the volume) to the active financial interface 112. In some configurations, the active financial interface 112 may take the form of an automated voice system, interactive voice response system, or other user interface configured to receive a sensory input. In turn, the active financial interface 112 may receive the sensory input such as a voice input. The voice input may include a voice key (e.g., key words, phrases, or characters) structured to indicate a sensory impairment. For example, the customer may speak the phrase "speak louder," "turn the volume up," "I cannot hear you," "What?", etc. into a receiver of the user device 110 while the customer interacts with an interactive voice response system associated with the financial institution computing system 120. The voice key may be identified, detected, derived, or otherwise received by the interface circuit 210 via an algorithm configured for voice recognition.

The sensory input may be provided to and/or received by the interface circuit 210 when the customer interacts with (e.g., when the customer selects or otherwise utilizes) an interface control. As used herein, an interface control may be used to refer to a button, link, icon, menu, graphic, scan, remote control, etc. facilitates the provision or receipt of a sensory input or otherwise provides an associated "request" to a server or client based system. The interface circuit 210 may provide the sensory input via the "request" to the sensory circuit 130 for analysis. In turn, the receipt of the sensory input, via the request, by the sensory circuit 130 may be used to determine if the customer has a sensory impairment when interacting with the financial institution computing system 120 as described herein. For example, the receipt of the sensory input may be used to determine if the customer has a sensory impairment when the customer views or requests account information via the active financial interface 112.

In some configurations, the interface circuit 210 of the user device 110 may receive, via a third party system, sensory data (e.g., data associated with or otherwise related to the senses such as, but not limited to, sight, touch, hearing, etc.) associated with the customer. Alternatively or additionally, the sensory circuit 130 of the financial institution computing system 120 may receive, via a third party system, sensory data associated with the customer. To that end, sensory data associated with the customer may be received by the interface circuit 210 and/or the sensory circuit 130 via multiple devices in an internet of things (IoT) environment, or via a third party system, such as a healthcare provider system, prescription drug system, etc. to leverage data collection and analysis.

At 304, the sensory circuit 130 of the user device 110 may determine a sensory impairment associated with the customer based on the sensory input. The sensory impairment of the customer may be determined in real-time or near real-time when the customer interacts with the active financial interface 112. For example, the sensory impairment may be determined during a financial transaction while the customer interacts with the active financial interface 112. The determination of the sensory impairment may generate a "response" from the server and/or client based system. Accordingly, the sensory circuit 130 may determine that a customer is visually impaired if the sensory input received includes a text or font change. For example, the sensory circuit 130 may determine that a customer is visually impaired if the customer increases the font size repeatedly on the user device 110. In other examples, the sensory circuit 130 may determine that a customer is visually impaired if the sensory input received results in one or more missing buttons, characters, input areas, or key inputs associated with the display 204 (e.g., a touch screen). For example, the sensory circuit 130 may determine that a customer is visually impaired if the customer fails to accurately select one or more buttons associated with the touch screen of the user device 110.

The sensory circuit 130 may determine that the customer is hearing impaired if the sensory input received includes a volume adjustment. For example, the customer increases the volume of the user device 110 and/or requests for things to be repeated when interacting with (e.g., speaking) the active financial interface 112 associated with an interactive voice response system. In other arrangements, the sensory circuit 130 may determine that the customer has a sensory impairment if the sensory input indicates that the customer is having difficulty with dexterity by monitoring the time and cadence in which responses are provided via the keyboard, keypad, or other character input system or user input/output 206 system or application of the user device 110.

The sensory circuit 130 of the user device 110 may establish an impairment level associated with the determined sensory impairment. The sensory data received may be used to generate or otherwise establish a base line (e.g., a base sensory level) associated with the customer. Alternatively or additionally, the base line may be established based on other factors such as the cognitive ability of the customer (e.g., cognitive data received by the financial institution computing system 120 from the third party system 150, the customer, etc.), the location of the customer (e.g., a branch location, ATM, and/or third party location), environmental factors (e.g., background noise, wind, rain, thunder, etc.), or a combination thereof. The base line may be established dynamically, such that deviations from the base line and/or histories of various base lines may be used advantageously to indicate fraud and proactively enhance fraud alerts. In some arrangements, the base line may be generated via the calculation engine 134 and transmitted to the sensory circuit 130 and/or the interface circuit 210 for comparison to subsequent sensory impairment levels as described herein.

In some configurations, the sensory circuit 130 may determine a change in the sensory impairment level as compared to the generated base line. The generated base line may be associated with identification data associated with the customer via the identification circuit 132. The base line and changes to the sensory impairment level may be stored in the account database 140 and/or memory of the financial institution computing system. In further examples, the sensory circuit 130 may monitor changes in the sensory impairment levels of the customer to detect possible fraud. As the interface circuit 210 receives a sensory input via the active financial interface 112, the interface circuit 210 may provide or otherwise transmit the data associated with the sensory input of the customer to the sensory circuit 130 and/or the calculation engine 134 of the financial institution computing system 120. The sensory circuit 130 and/or the calculation engine 134 may determine a change in the sensory impairment level as compared to the base line.

If the sensory impairment level meets or falls below the base line, the sensory circuit 130 may determine that the sensory impairment of the customer has not changed such that fraudulent activity is not indicated. If the sensory impairment level is not within an acceptable range of the base line when the customer interacts with the active financial interface 112, the sensory circuit 130 may determine that the sensory impairment of the customer is indicative of fraudulent activity. For example, if an improvement in the sensory impairment level is determined or otherwise detected, the sensory circuit 130 may determine that a third party (e.g., another person) may be attempting to fraudulently access the account of the customer.

In further embodiments, the sensory circuit 130 may transmit a notification to the customer in response to the determination of the fraudulent activity. The notification may be transmitted or otherwise received when the third party (e.g., the bad actor) is not in proximity to the customer. If the location of the third party is determined to be in proximity to the location of the customer, the notification may be transmitted to another person that the customer authorized to receive notifications on behalf of the customer. In some embodiments, the notification may be provided via a different channel. E.g., the person performs an online transaction via an online banking website, and then the bank calls the customer to verify the transaction. Voice recognition is used to verify the identity of the individual during the phone call. Or, we ask the person to hold their phone in front of them, and we do a selfie video verification (facial recognition using a live video feed). Heightened authentication can occur during the transaction: e.g., if potential fraud is detected due to decreased impairment, the user is asked additional security questions. In some embodiments, a frictionless technique includes varying a visual, auditory, sensory, and memory dynamic test as the user is actively using the dynamic interface system 100 or as a starter to initiate certain functions to detect which interface option or setting provides the most correct or desired responses by the user.

The sensory circuit 130 may be configured to cause a dynamic interface adjustment (e.g., an adjustment of the user interface in real-time or near real-time) of the active financial interface 112 in response to the determination of the sensory impairment at 306. The dynamic interface adjustment may include, but is not limited to, an audible adjustment, visual adjustment, input response adjustment, communication mode adjustment, or a combination thereof. The dynamic interface adjustment may be built or otherwise rendered via the user device 110. Based on the determination of the sensory impairment, the sensory circuit 130 may cause a dynamic interface adjustment, via the interface circuit 210, of the way in which information is provided to the customer via the active financial interface 112. In examples wherein the customer is determined to be hearing impaired, the interface circuit 210 may cause an increase in the volume of an audible message. In other examples wherein the customer is determined to be hearing impaired, the interface circuit 210 may cause the cadence of an audible message to decrease. In examples wherein it is determined that the customer is in a public setting, some dynamic interface adjustments may be inactive (e.g., disabled). For example, the interface circuit 210 may not cause an increase in the volume of an audible message to prevent others near, or proximate to, the customer from hearing the volume increase. Yet in other examples, the interface circuit 210 may cause an increase in the volume of an audible message that increases within an acceptable volume range that may be loud enough for the customer to hear, yet low enough to prevent others near, or proximate to, the customer from hearing the volume increase.

In some examples wherein the customer is determined to be visually impaired, the sensory circuit 130 may cause a dynamic interface adjustment (e.g., a visual adjustment) of the active financial interface 112 such that the screen size may be increased or decreased, the font may be increased or decreased, the dimensions or structure of the keyboard, keypad, or other character input system (e.g. soft key sizes) may be increased or decreased, etc. In other examples wherein the customer is determined to be visually impaired, the sensory circuit 130 may cause a dynamic interface adjustment of the active financial interface 112 such that the font color, background color, font type, or text-to-voice system may be adjusted to provide information to the customer.

In further examples, the dexterity input (e.g. the speed or rate of typing input) of the customer may result in a determination that the customer has a sensory impairment. Accordingly, the sensory circuit 130 may be configured to cause a dynamic interface adjustment (e.g., an input response adjustment) such that the interface circuit 210 may increase an input wait period to allow the customer more time to input a response via the active financial interface 112. In other examples wherein the sensory impairment is associated with a dexterity input, the sensory circuit 130 may cause a dynamic interface adjustment (e.g., a communication mode adjustment) by which other interface channels (e.g., a channel by which the customer interacts with the financial institution computing system in person, over the phone, etc.) may be provided to the customer via the active financial interface 112. Alternatively or additionally, the sensory circuit 130 may be configured to cause a dynamic interface adjustment in examples wherein the determined sensory impairment may require the user interface to provide other visual cues (e.g., e-mails, text messages, or other textual matters) to the customer while the customer interacts with the active financial interface 112.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated.

Other substitutions, modifications, changes and omissions may be made in the design, operating conditions and arrangement of the embodiments without departing from the scope of the present disclosure as expressed in the appended claims.

What is claimed is:

1. A method of causing a dynamic interface adjustment of a customer device, the method comprising:
    receiving, via an active financial interface communicatively coupled to a financial institution, a first sensory input associated with a customer of the financial institution;
    determining a sensory impairment of the customer based on the first sensory input;
    establishing a base sensory level associated with the determined sensory impairment;
    causing a dynamic interface adjustment of the active financial interface in response to the determination of the sensory impairment;
    receiving a second sensory input associated with an account of the customer;
    determining a change in the sensory impairment based on the base sensory level and the second sensory input;
    determining that the second sensory input is associated with a fraudulent action by a third party based on the change in the sensory impairment; and
    transmitting a notification of fraudulent activity to the customer based on determining that the second sensory input is associated with the fraudulent action.

2. The method of claim 1, wherein the sensory impairment comprises a visual impairment, hearing impairment, or a combination thereof.

3. The method of claim 1, wherein the first sensory input comprises an input associated with a screen size change, screen reader, voice input, volume adjustment, dexterity input, or a combination thereof.

4. The method of claim 1, wherein the first sensory input comprises an input associated with a voice input and wherein the voice input comprises a voice key structured to indicate the sensory impairment.

5. The method of claim 1, wherein determining that the second sensory input is associated with the fraudulent action is based on a location associated with the second sensory input.

6. The method of claim 1, wherein the dynamic interface adjustment comprises an audible adjustment, visual adjustment, input response adjustment, communication mode adjustment, or a combination thereof.

7. The method of claim 1, wherein the change in the sensory impairment of the customer is a decrease in the sensory impairment.

8. A system for causing a dynamic interface adjustment of a customer device, the system comprising:
    a user device comprising an active financial interface associated with a financial institution; and
    a computer system communicatively coupled to the user device, the computer system configured to:
        receive, via the user device, a first sensory input associated with a customer of the financial institution;
        determine a sensory impairment of the customer based on the first sensory input;
        establish a base sensory level associated with the determined sensory impairment;
        cause a dynamic interface adjustment of the active financial interface in response to the determination of the sensory impairment;

receive a second sensory input associated with an account of the customer;

determine a change in the sensory impairment based on the base sensory level and the second sensory input;

determine that the second sensory input is associated with a fraudulent action by a third party based on the change in the sensory impairment; and transmit a notification of fraudulent activity to the customer based on determining that the second sensory input is associated with the fraudulent action.

9. The system of claim 8, wherein the sensory impairment comprises a visual impairment, hearing impairment, or a combination thereof.

10. The system of claim 8, wherein the first sensory input comprises a screen size change, screen reader, voice input, volume adjustment, dexterity input, or a combination thereof.

11. The system of claim 8, wherein the first sensory input comprises an input associated with a voice input and wherein the voice input comprises a voice key structured to indicate the sensory impairment.

12. The system of claim 8, wherein the dynamic interface adjustment comprises an audible adjustment, visual adjustment, input response adjustment, communication mode adjustment, or a combination thereof.

13. The system of claim 8, wherein the sensory impairment of the customer is determined during a financial transaction.

14. The system of claim 8, wherein the sensory impairment of the customer is determined in real-time or near real-time of the first sensory input.

15. The system of claim 8, wherein the dynamic interface adjustment of the active financial interface is caused in real-time or near real-time of the first sensory input.

16. The system of claim 8, wherein the first sensory input is received via an interface control, and wherein the interface control comprises a button, link, icon, menu, graphic, scan, remote control, or combination thereof.

17. The system of claim 8, wherein the computer system is further configured to determine that the second sensory input is associated with the fraudulent action based on a location associated with the second sensory input.

18. The system of claim 17, wherein the computer system is further configured to:

transmit a notification of fraudulent activity to an authorized person based on determining that the second sensory input is associated with the fraudulent action and based on the location associated with the second sensory input being in proximity of a location of the customer.

19. The system of claim 8, wherein the change in the sensory impairment of the customer is a decrease in the sensory impairment.

20. A computer implemented method of causing a dynamic interface adjustment of a customer device, the method comprising:

receiving, via an active financial interface communicatively coupled to a financial institution, a first sensory input associated with a customer of the financial institution;

determining a sensory impairment of the customer based on the first sensory input;

establishing a base sensory level associated with the determined sensory impairment;

causing a dynamic interface adjustment of the active financial interface in response to the determination of the sensory impairment;

receiving a second sensory input associated with an account of the customer;

determining a change in the sensory impairment based on the base sensory level and the second sensory input;

determining that the second sensory input is associated with a fraudulent action by a third party based on the change in the sensory impairment; and transmitting a notification of fraudulent activity to the customer in response to determining that the second sensory input is associated with the fraudulent action.

21. The computer implemented method of claim 20, wherein the sensory impairment comprises a visual impairment, hearing impairment, or a combination thereof.

22. The computer implemented method of claim 20, wherein the first sensory input comprises an input associated with a screen size change, screen reader, voice input, volume adjustment, dexterity input, or a combination thereof.

23. The computer implemented method of claim 20, wherein the change in the sensory impairment of the customer is a decrease in the sensory impairment.

24. The computer implemented method of claim 23, further comprising requesting one or more answers to one or more security questions in response to determining that the second sensory input is associated with the fraudulent action.

* * * * *